US010359843B2

United States Patent
Lee et al.

(10) Patent No.: US 10,359,843 B2
(45) Date of Patent: Jul. 23, 2019

(54) ELECTRONIC APPARATUS AND DISPLAY CONTROL METHOD THEREOF

(71) Applicant: HTC Corporation, Taoyuan (TW)

(72) Inventors: Yu-Cheng Lee, Taoyuan (TW); Chung-Ying Yeh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 221 days.

(21) Appl. No.: 15/077,912

(22) Filed: Mar. 23, 2016

(65) Prior Publication Data

US 2016/0291850 A1   Oct. 6, 2016

Related U.S. Application Data

(60) Provisional application No. 62/141,263, filed on Apr. 1, 2015.

(51) Int. Cl.
*G06F 1/16* (2006.01)
*G06F 3/01* (2006.01)
(Continued)

(52) U.S. Cl.
CPC .............. *G06F 3/013* (2013.01); *G06F 1/163* (2013.01); *G06F 1/1694* (2013.01);
(Continued)

(58) Field of Classification Search
CPC ........ G06F 1/1654; G06F 1/169; G06F 1/163; G06F 1/1694; G06F 1/3215; G06F 1/3231; A61B 5/002
(Continued)

(56) References Cited

U.S. PATENT DOCUMENTS

2006/0251365 A1* 11/2006 Brewer ..................... G02B 6/08
  385/116
2013/0342483 A1* 12/2013 Seo ......................... G06F 3/0488
  345/173
(Continued)

FOREIGN PATENT DOCUMENTS

CN    104272711    1/2015
CN    104424029    3/2015
(Continued)

OTHER PUBLICATIONS

"Office Action of Taiwan Counterpart Application", dated Jan. 17, 2017, p. 1-p. 12.
(Continued)

*Primary Examiner* — Vu Nguyen
(74) *Attorney, Agent, or Firm* — JCIPRNET

(57) ABSTRACT

An electronic apparatus wearable for a user and a display control method thereof are provided. The electronic apparatus includes an interactive display device, a supplementary input device and a processor device. The interactive display device displays a user interface. The processor device coupled to the interactive display device and the supplementary input device detects a clockwise movement and a counter-clockwise movement performed on the supplementary input device, wherein the clockwise movement and the counter-clockwise movement are associated with a function under an operation mode of the electronic apparatus. When one of the clockwise movement and the counter-clockwise movement is detected, the processor device correspondingly performs is the function. When the function is an interface rotation function, the processor device rotates the user interface on the interactive display device in accordance with the detected clockwise movement and the detected counter-clockwise movement.

14 Claims, 7 Drawing Sheets

(51) Int. Cl.
*G06F 3/0362* (2013.01)
*G06F 3/0346* (2013.01)
*G06F 3/16* (2006.01)

(52) U.S. Cl.
CPC .......... *G06F 3/0346* (2013.01); *G06F 3/0362* (2013.01); *G06F 3/167* (2013.01); *G06F 2200/1614* (2013.01)

(58) Field of Classification Search
USPC ........................................................ 345/657
See application file for complete search history.

(56) References Cited

U.S. PATENT DOCUMENTS

| | | | |
|---|---|---|---|
| 2014/0087685 A1 | 3/2014 | Kellond et al. | |
| 2014/0139486 A1 | 5/2014 | Mistry et al. | |
| 2014/0139637 A1* | 5/2014 | Mistry | H04N 5/2252 |
| | | | 348/46 |
| 2015/0049037 A1 | 2/2015 | Vincent et al. | |
| 2016/0077592 A1* | 3/2016 | Bhesania | G06F 3/011 |
| | | | 345/650 |

FOREIGN PATENT DOCUMENTS

| | | |
|---|---|---|
| JP | 2014186731 | 10/2014 |
| TW | I439826 | 6/2014 |

OTHER PUBLICATIONS

"Office Action of China Counterpart Application", dated Aug. 16, 2018, p. 1-p. 9.

\* cited by examiner

ELECTRONIC APPARATUS AND DISPLAY CONTROL METHOD THEREOF

CROSS-REFERENCE TO RELATED APPLICATION

This application claims the priority benefit of U.S. provisional application Ser. No. 62/141,263, filed on Apr. 1, 2015. The entirety of the above-mentioned patent application is hereby incorporated by reference herein and made a part of this specification.

BACKGROUND

Technical Field

The disclosure is directed to an electronic apparatus and a display control method thereof, and more particularly, directed to an electronic apparatus that can be worn by a user and a display control method thereof.

Description of Related Art

Along with the development of technologies, electronic devices have become smaller and more powerful. Currently, miniature electronic device with various functions could be worn by a person without causing uncomfortableness, so it becomes more popular. In general, wearable devices are able to perform some basic functions, such as timekeeping, calculation, game-playing, and the like. Some of them are able to run applications, programs or even an operating system, such that those wearable devices are suitable being applied in healthcare, wireless communication, or fitness track.

However, since the wearable devices are usually small, their input devices, such as keyboards, physical buttons, touch pads and/or touch screens, have various physical limitations and constraints, especially on sizes of those input devices. This will lead to inconvenience on watching, using, or controlling the wearable device. For example, when utilizing a wearable device equipped with the touch screen in strenuous exercise or workout, it is nearly impossible and inconvenient for the user to view the displayed content or tap precisely on a small option or a small virtual button on the touch screen. Therefore, how to provide a wearable device with better viewing quality and visual effect is still an important topic for people in the art.

SUMMARY

The present disclosure is directed to an electronic apparatus wearable for a user, on which an improved control mechanism is provided. A display control method thereof is also proposed in the present disclosure.

An embodiment of the present disclosure provides an electronic apparatus, which is wearable for a user. The electronic apparatus includes an interactive display device, a supplementary input device and a processor device. The interactive display device displays a user interface. The processor device coupled to the interactive display device and the supplementary input device detects a clockwise movement and a counter-clockwise movement performed on the supplementary input device. The clockwise movement and the counter-clockwise movement are associated with a function under an operation mode of the electronic apparatus. When one of the clockwise movement and the counter-clockwise movement is detected, the processor device correspondingly performs the function. When the function is an interface rotation function, the processor device rotates the user interface on the interactive display device in accordance with the detected clockwise movement and the detected counter-clockwise movement.

In one embodiment of the present disclosure, when the function is the interface rotation function, the supplementary input device is also rotated with the clockwise movement and the counter-clockwise movement performed on the supplementary input device.

In one embodiment of the present disclosure, the electronic apparatus further includes a sensing device. The sensing device coupled to the processor device obtains a first sensing data. The processor device recognizes a movement pattern of the user from the first sensing data, and rotates the user interface on the interactive display device according to the movement pattern.

In one embodiment of the present disclosure, the processor device further recognizes a traveling direction of the user from the first sensing data, and rotates the user interface on the interactive display device according to the movement pattern and the traveling direction of the user.

In one embodiment of the present disclosure, the processor device further recognizes a body part of the user at where the electronic apparatus is worn by the user, and rotates the user interface on the interactive display device according to the body part and the movement pattern of the user.

In one embodiment of the present disclosure, the processor device rotates the user interface on the interactive display device for a fixed angle corresponding to the recognized movement pattern. After the user interface is rotated for the fixed angle, if the user interface on the interactive display device is further rotated for an additional angle in accordance with the one of the detected clockwise movement and the detected counter-clockwise movement, the processor device updates the fixed angle corresponding to the recognized movement pattern based on the additional angle.

In one embodiment of the present disclosure, the electronic apparatus further includes a communication device. The communication device coupled to the processor device communicates with a secondary electronic apparatus. The communication device obtains a second sensing data from the secondary electronic apparatus. The processor device calculates a relative position of an eye region of the user and the electronic apparatus based on the first sensing data and the second sensing data, and rotates the user interface on the interactive display device according to the relative position.

In one embodiment of the present disclosure, the electronic apparatus further includes an audio input device and an audio output device. The audio input device coupled to the processor device receives a voice command. When the voice command received by the audio input device is related to an interface rotation, the processor device correspondingly rotates the user interface on the interactive display device. The audio output device coupled to the processor device provides a voice tip according to the operation mode of the electronic apparatus.

Another embodiment of the present disclosure provides a display control method, adapted to an electronic apparatus wearable for a user. The display control method includes the following steps. A user interface is displayed by an interactive display device. A clockwise movement and a counter-clockwise movement performed on a supplementary input device are detected. When one of the clockwise movement and the counter-clockwise movement is detected, an interface rotation function is performed under an operation mode of the electronic apparatus, such that the user interface is rotated in accordance with the one of the clockwise movement and the counter-clockwise movement.

According to the above description, the electronic apparatus wearable for the user and the display control method thereof allow the user to manually control the electronic apparatus and the user interface through the clockwise movement and the counter-clockwise movement performed on the supplementary input device. The user interface may also be rotated by the electronic apparatus based on various factors such as the movement pattern and the traveling direction of the user. In addition, the user interface may be rotated by the user through the voice command as well. As the result, the user can easily view the displayed user interface of the electronic apparatus, and better viewing quality and visual effect can be achieved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1A:
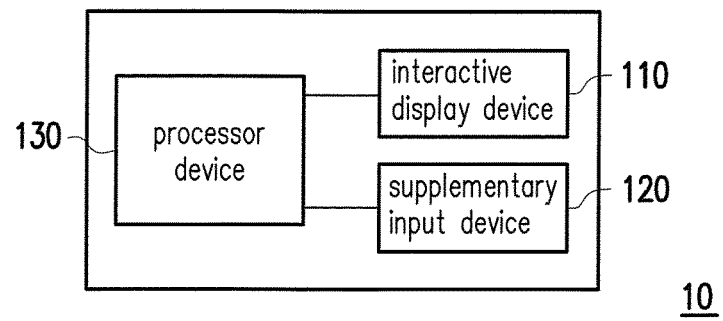
FIG. 1A illustrates a block diagram of an electronic apparatus according to an exemplary embodiment of the present disclosure.

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1A illustrates a block diagram of an electronic apparatus according to an exemplary embodiment of the present disclosure. Referring to FIG. 1A, in the present embodiment, the electronic apparatus 10 includes an interactive display device 110, at least one supplementary input device 120 and a processor device 130. The electronic apparatus 10 may be a wearable electronic apparatus implemented in a form of a sticker, a wristband, a heart rate band, a helmet, a necklace, a watch, a ring, a bracelet, a clothes, or a belt, etc., capable of being worn by a user, but is not limited thereto. An example of the electronic apparatus 10 is the smart watch.

In one embodiment of the present disclosure, the interactive display device 110 for displaying a user interface is, for example, a touch display device combined with a touch input ability and a display ability, though the disclosure is not limited thereto. In detail, the touch display device 110 may be composed of a display panel and a touch panel. The display panel may be, for example, a liquid crystal display (LCD) panel, a light-emitting diode (LED) display panel, an organic light-emitting diode (OLED) display panel, a plasma display panel or other types of display panels. The touch panel may be, for example, a resistive touch panel, a capacitive touch panel, an optical touch panel or other types of touch panels. In another embodiment of the present disclosure, the interactive display device 110 may only contain a display panel.

In one embodiment of the present disclosure, the supplementary input device 120 is, for example, a keyboard, a physical button or a touch pad, but the present disclosure is not limited herein. The supplementary input device 120 is utilized by the user for controlling the electronic apparatus 10. Specifically, when the electronic apparatus 10 is implemented in a form of watch, the supplementary input device 120 may be a bezel or a knob on the watch.

In one embodiment of the present disclosure, the processor device 130 coupled to the interactive display device 110 and the supplementary input device 120 may include one or more of a North Bridge, a South Bridge, a field programmable array (FPGA), a programmable logic device (PLD), an application specific integrated circuit (ASIC), or other similar device or a combination thereof. The processor device 130 may also include a central processing unit (CPU), a programmable general purpose or special purpose microprocessor, a digital signal processor (DSP), a graphics processing unit (GPU), an application specific integrated circuit (ASIC), a programmable logic device (PLD), or other similar devices or a combination thereof.

Figure 1B:
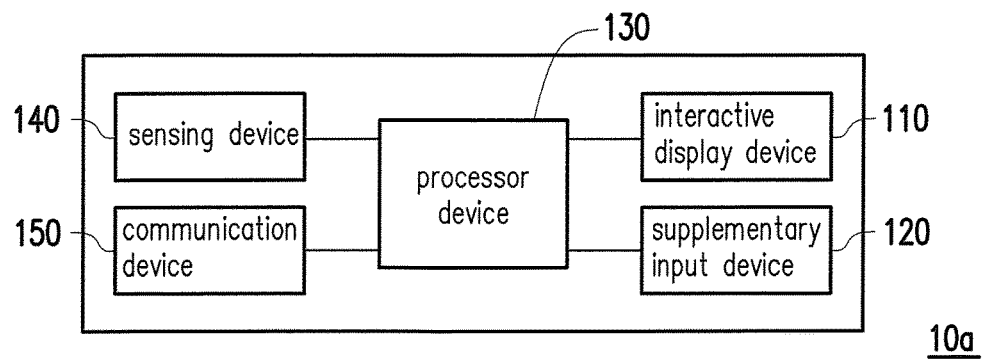
FIG. 1B illustrates a block diagram of an electronic apparatus according to another exemplary embodiment of the present disclosure.

FIG. 1B illustrates a block diagram of an electronic apparatus according to another exemplary embodiment of the present disclosure. Referring to FIG. 1B, compared to the electronic apparatus 10 shown in FIG. 1A, the electronic apparatus 10a further includes at least one sensing device 140 and a communication device 150. The electronic apparatus 10a may also be a wearable electronic apparatus implemented in a form of a sticker, a wristband, a heart rate band, a helmet, a necklace, a watch, a ring, a bracelet, a clothes, or a belt, etc., capable of being worn by the user, but is not limited thereto.

In one embodiment of the present disclosure, the sensing device 140 coupled to the processor device 130 may include an acceleration sensor, a gravity sensor (G sensor), a gyro sensor, a digital compass, an electronic compass, or similar sensors, or a combination of the above sensors for detecting acceleration, an orientation, an inclination angle, a rotation angle or a facing direction of the electronic apparatus 10*a*. The sensing device 140 may also include a thermometer, a barometer, a blood pressure meter, a blood-glucose meter, a body fat monitor, a gas sensor, a hydration sensor, an electrocardiogram (ECG/EKG), a pedometer, or any other physiological data measuring sensor, or a combination of the above devices, but is not limited thereto. The sensing device 140 may be integrated with the electronic apparatus 10*a* or may be an independent device wireless connected to the electronic apparatus 10*a*.

In one embodiment of the present disclosure, the communication device 150 coupled to the processor device 130 may include, a wireless communication module, a wired communication module or both the wireless communication module and the wired communication module. The wireless communication module may be a wireless fidelity (Wi-Fi) module, a Bluetooth module, a Bluetooth low energy (BLE) module, an infrared rays (IR) module, a near-field communication (NFC) module, a long term evolution (LTE) module, a worldwide interoperability for microwave access (WiMax) module, a device-to-device (D2D) module or a combination of thereof. The wired communication module may be a universal serial bus (USB), a RS232, a universal asynchronous receiver-transmitter (UART), an inter-integrated circuit (I2C), a serial peripheral interface (SPI), a display port, a thunderbolt, a local area network (LAN) interface or a combination thereof.

In one embodiment of the present disclosure, both of the electronic apparatus 10 and the electronic apparatus 10*a* may include a storage device (not illustrated). The storage device is configured to store data, applications, programs or software, and accessible by the processor device 130. The storage unit may be, for example, a hard disk drive (HDD), a volatile memory, a non-volatile memory or a combination thereof.

Figure 1C:
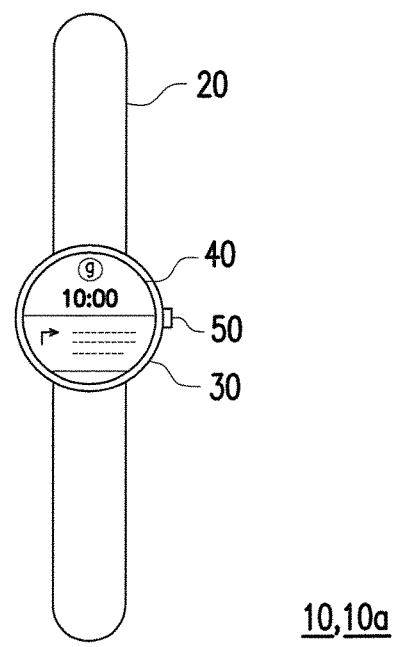
FIG. 1C illustrates a schematic diagram of an electronic apparatus according to an exemplary embodiment of the present disclosure.

FIG. 1C illustrates a schematic diagram of an electronic apparatus according to an exemplary embodiment of the present disclosure. Referring to FIGS. 1A, 1B and 1C, both the electronic apparatus 10 and the electronic apparatus 10*a* may be designed as a wristwatch including a flexible strap 20 and a watch body 30, but it is not limited thereto. The interactive display device 110, the processor device 130, the at least one sensing device 140, the communication device 150 and the storage device (not illustrated) are selectively disposed at the flexible strap 20 or the watch body 30. Moreover, in an embodiment of the present disclosure, the watch body 30 and the interactive display device 110 are designed as a push-button, such that the interactive display device 110 are pressable. The pressable interactive display device 110 may utilized as another supplementary input device 120.

Furthermore, in the present embodiment, the supplementary input device 120 may include a bezel 40 and a physical knob 50 configured on the watch body 30. Specifically, the bezel 40 may be disposed around the interactive display device 110 and implemented as a touch input device. In one embodiment of the present disclosure, at least one touch sensor is disposed within the bezel 40 for detecting a single press, multiple presses, moving and sliding on the bezel 40. As shown in FIG. 1C, the bezel 40 has a ring shape, but it is not limited thereto. For concise purpose, in the following description, only the electronic apparatus 10*a* is taken for illustrating and explaining the present disclosure, but the present disclosure is not limited to the electronic apparatus 10*a*.

In the present embodiment of the present disclosure, the user of the electronic apparatus 10*a* may touch the bezel 40 and move his finger clockwise or counter-clockwise on the bezel 40, and the clockwise movement and the counter-clockwise movement performed on the bezel 40 are detected by the processor device 130. The clockwise movement and the counter-clockwise movement are associated with different functions under different operation modes of the electronic apparatus 10*a*. To be more specific, the operation mode of the electronic apparatus 10*a* may be determined by the application or the program executed on the electronic apparatus 10*a*.

For instance, when a multimedia player application is executed on the electronic apparatus 10*a*, the electronic apparatus 10*a* may be defined as operated under a multimedia playing mode. At this moment, the clockwise movement and the counter-clockwise movement performed on the bezel 40 may be associated with a music selection function, a music playing function, a video selection function or a video playing function. As such, when the user touches the bezel 40 and moves his finger clockwise, the clockwise movement performed on the bezel 40 is detected, such that the processor device 130 may fast forward a song, fast forward a video, jump to next track or jump to next video. Moreover, when the user touches the bezel 40 and moves his finger counter-clockwise, the counter-clockwise movement performed on the bezel 40 is detected, such that the processor device 130 may backward a song, backward a video, jump to previous track or jump to previous video.

In another embodiment of the present disclosure, the clockwise movement and the counter-clockwise movement performed on the bezel 40 may be associated with a volume adjustment function under the multimedia playing mode of the electronic apparatus 10*a*. As such, when the user touches the bezel 40 and moves his finger clockwise, the clockwise movement performed on the bezel 40 is detected, such that the processor device 130 may increase the audio volume of the electronic apparatus 10*a*. By contrast, when the user touches the bezel 40 and moves his finger counter-clockwise, the counter-clockwise movement performed on the bezel 40 is detected, such that the processor device 130 may decrease the audio volume of the electronic apparatus 10*a*.

In another embodiment of the present disclosure, the clockwise movement and the counter-clockwise movement performed on the bezel 40 may be associated with a switching function under an idle operation mode, in which a home page with application icons of the electronic apparatus 10*a* is displayed by the interactive display device 110. The user may touch the bezel 40 and move his finger clockwise or counter-clockwise on the bezel 40 to select the application which is desired to be executed.

In another embodiment of the present disclosure, the clockwise movement and the counter-clockwise movement performed on the bezel 40 may be associated with a zoom in/out function. To be more specific, when an image, a document or a webpage is shown by an application or a browser under a browsing mode of the electronic apparatus, the user may touch the bezel 40 and move his finger clockwise or counter-clockwise on the bezel 40 to zoom in or to zoom out the image, the document or the webpage. That is to say, when the clockwise movement or the counter-clockwise movement performed on the bezel 40 detected, the processor device 130 correspondingly enlarges or narrows the image, the document or the webpage.

Obviously, the usage of the bezel 40 provides an intuitive and user-friendly interface for performing the various functions, and thus it is more convenient on controlling the electronic apparatus 10a without seeing and touching the interactive display device 110. It should be noted that, in one embodiment of the present disclosure, instead of the bezel 40 having the touch sensor, a rotatable bezel (not illustrated in figures) can also be utilized as the supplementary input device 120. The user may rotate the bezel clockwise or counter-clockwise for music selecting, video selecting, volume adjusting, application switching, zoom in/out and so on. The clockwise movement and the counter-clockwise movement performed on the bezel is detected by the processor device 130, and the corresponding function is performed by the processor device 130.

Furthermore, in another embodiment of the present disclosure, instead of the bezel 40, an outside ring part of the interactive display device 110 with touch input ability is implemented as the supplementary input device 120. The user may move his finger clockwise or counter-clockwise on the outside ring part of the interactive display device 110 for music selecting, video selecting, volume adjusting, application switching, zoom in/out and so on. The clockwise movement and the counter-clockwise movement performed on the outside ring part of the interactive display device 110 are detected by the processor device 130, and the corresponding function is performed by the processor device 130.

Figure 2A:
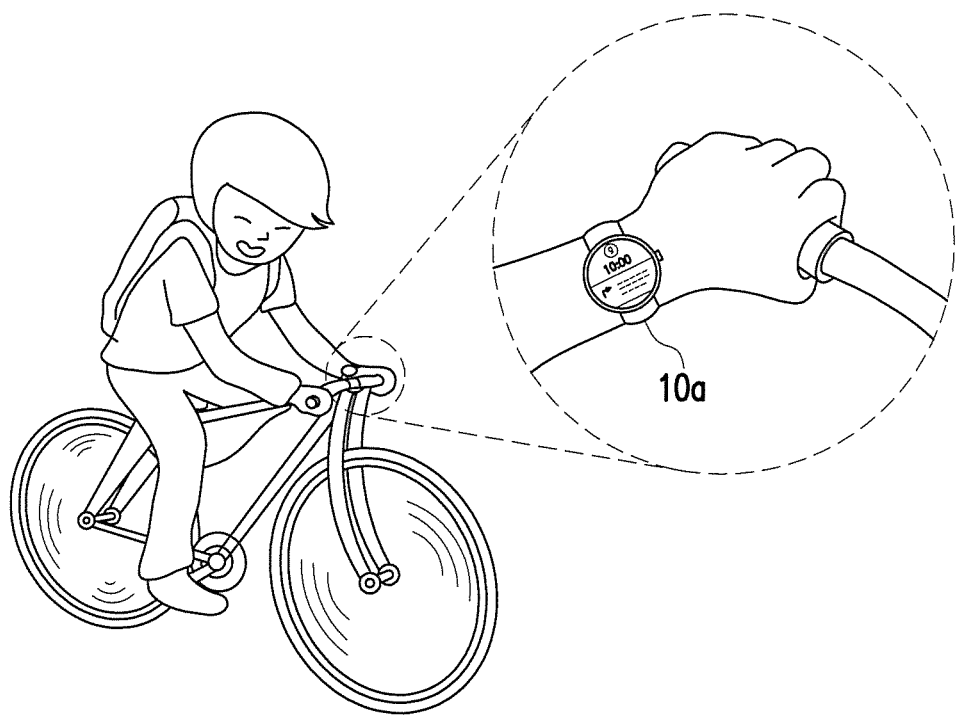
FIG. 2A illustrates a schematic diagram of wearing an electronic apparatus while cycling.

Since the electronic apparatus 10a is wearable, the electronic apparatus 10a may be worn on a wrist, an arm, a hand, an ankle, a knee, a leg or any part of the body of the user. For the user interface displayed in a fixed orientation, it is required the user to move the electronic apparatus 10a by his limb, head, or body to a comfortable viewing position of user's eyes for best view of the displayed user interface. However, in some situation, such as fitness training, sport training, jogging, cycling and driving, the user is unable or inconvenient to move the electronic apparatus 10a to the comfortable viewing position. For example, FIG. 2A illustrates a schematic diagram of wearing an electronic apparatus while cycling. As shown in FIG. 2A, the user is required to hold the handlebar while cycling, therefore results in bad view of the user interface displayed by the electronic apparatus 10a worn on the wrist of the user.

Based on the above description, in an embodiment of the present disclosure, when an application related to fitness training or sport training is executed, the operation mode of the electronic apparatus 10a is defined as a fitness mode. Further, when the electronic apparatus 10a detects that the user of the electronic apparatus 10a is in fitness training, sport training, jogging or cycling, the operation mode of the electronic apparatus 10a may also be set to the fitness mode. Also, the user may manually set the operation mode to the fitness mode before fitness training, sport training, jogging or cycling.

Figure 2B:
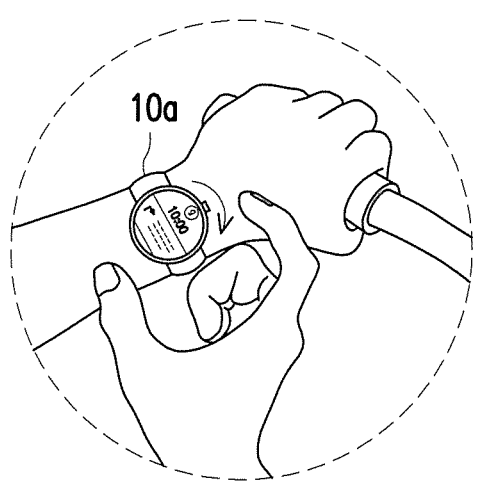
FIG. 2B illustrates a schematic diagram of rotating displayed user interface while cycling according to an exemplary embodiment of the present disclosure.

The clockwise movement and the counter-clockwise movement performed on the supplementary input device 120 are associated with an interface rotation function under the fitness mode of the electronic apparatus 10a. That is to say, under the fitness mode, the processor device 130 rotates the user interface on the interactive display device in accordance with the detected clockwise movement and the detected counter-clockwise movement. FIG. 2B illustrates a schematic diagram of rotating displayed user interface while cycling according to an exemplary embodiment of the present disclosure. Referring to FIG. 2B, the user may touch the bezel 40 and moves his finger clockwise or counter-clockwise, so as to rotate the displayed user interface to an orientation corresponding to the viewing angle of the user. As the result, after rotation, the user can clearly view the displayed user interface with his eyes.

In another embodiment of the present disclosure, when an application related to navigation is executed, the operation mode of the electronic apparatus 10a is defined as a driving mode. Further, when the electronic apparatus 10a detects that the user of the electronic apparatus 10a is in driving, the operation mode of the electronic apparatus 10a may also be set to the driving mode. The clockwise movement and the counter-clockwise movement performed on the supplementary input device 120 are associated with the interface rotation function under the driving mode as well.

In one embodiment of the present disclosure, when the supplementary input device 120 includes the rotatable bezel and the physical knob 50, and clockwise movement and the counter-clockwise movement performed on the supplementary input device 120 are associated with the interface rotation function, the rotatable bezel and the physical knob 50 is also rotated with the clockwise movement and the counter-clockwise movement performed on the supplementary input device 120.

Figure 3:
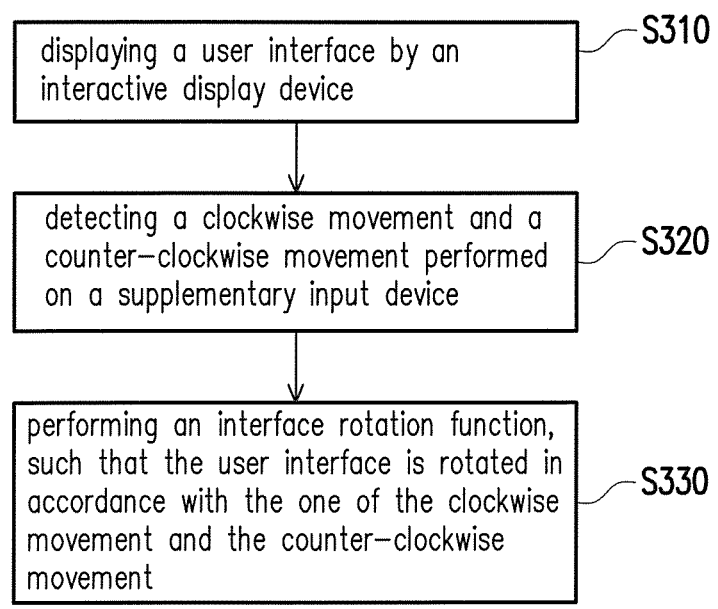
FIG. 3 illustrates a flow graph of a display control method according to an exemplary embodiment of the present disclosure.

FIG. 3 illustrates a flow graph of a display control method according to an exemplary embodiment of the present disclosure. As shown in FIG. 3, the display control method is adapted to both the electronic apparatus 10 and the electronic apparatus 10a, but it is not limited thereto. Referring to FIG. 3, the user interface is displayed by the interactive display device 110 (step S310). Further, the clockwise movement and the counter-clockwise movement performed on the supplementary input device 120 are detected by the processor device 130 (step S320). When one of the clockwise movement and the counter-clockwise movement is detected, the processor device 130 performs the interface rotation function, such that the user interface is rotated in accordance with the one of the clockwise movement and the counter-clockwise movement (step S330). It should be noted that, in one embodiment of the present disclosure, for executing the display control method shown in FIG. 3, the electronic apparatus 10 and the electronic apparatus 10a are operated under a specific operation mode, such as the fitness mode or the driving mode.

In the present disclosure, the electronic apparatus 10a may further automatically rotate the user interface, so as to obtain better viewing quality and visual effect for the user of the electronic apparatus 10a. To be more specific, first sensing data obtained by at least one sensing device 140 is further applied by the processor device 130 of the electronic apparatus 10a for automatically rotating the user interface on the interactive display device 110.

Figure 4A:
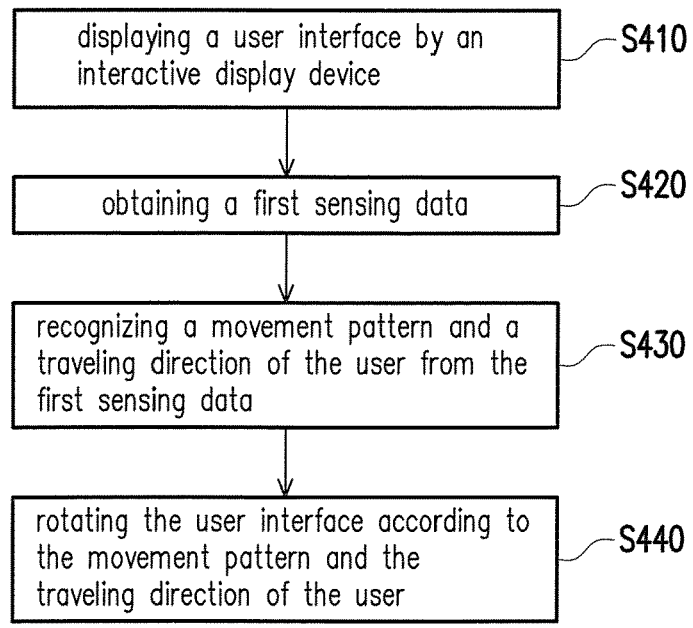
FIG. 4A illustrates a flow graph of a display control method according to an exemplary embodiment of the present disclosure.

FIG. 4A illustrates a flow graph of a display control method according to an exemplary embodiment of the present disclosure. The display control method shown in FIG. 4A for automatically rotating the user interface to the orientation corresponding to the viewing angle of the user is adapted to the electronic apparatus 10a. Referring to 4A, firstly, the user interface is displayed by the interactive display device 110 (step S410). After the user interface is displayed, a first sensing data is obtained by the sensing device 140 (step S420). In the present embodiment, the sensing device 140 is utilized for sensing at least one of the acceleration, the orientation, the inclination angle, the rotation angle and the facing direction of the electronic apparatus 10a. Thus, based on the first sensing data from the sensing device 140, movement pattern and traveling direction of the user are recognized by the processor device 130 (step S430).

The movement pattern of the user, especially the movement pattern of the part of the body where the electronic apparatus 10*a* is worn at, is recognized by the processor device 130 for determining the angle that the user interface should be rotated by the processor device 130. The angle that the user interface should be rotated during the fitness training or the sport training may be determined based on the type of the sport or the workout that the user is engaged. In one embodiment of the present disclosure, each type of the sport or the workout corresponds to a fixed angle. Thus, by recognizing the movement pattern of the user, the type of the sport or the workout that the user is engaged is determined, such that the processor device 130 may rotate the user interface by the fixed angle. Further, the traveling direction of the user is recognized by the processor device 130 for determining the rotation direction of the user interface.

Referring to FIG. 4A, after the movement pattern and the traveling direction of the user are recognized, the processor device 130 rotates the user interface on the interactive display device 110 according to the movement pattern and the traveling direction of the user (step S440). As the result, the user interface is rotated to the orientation corresponding to the viewing angle of the user.

Figure 4B:
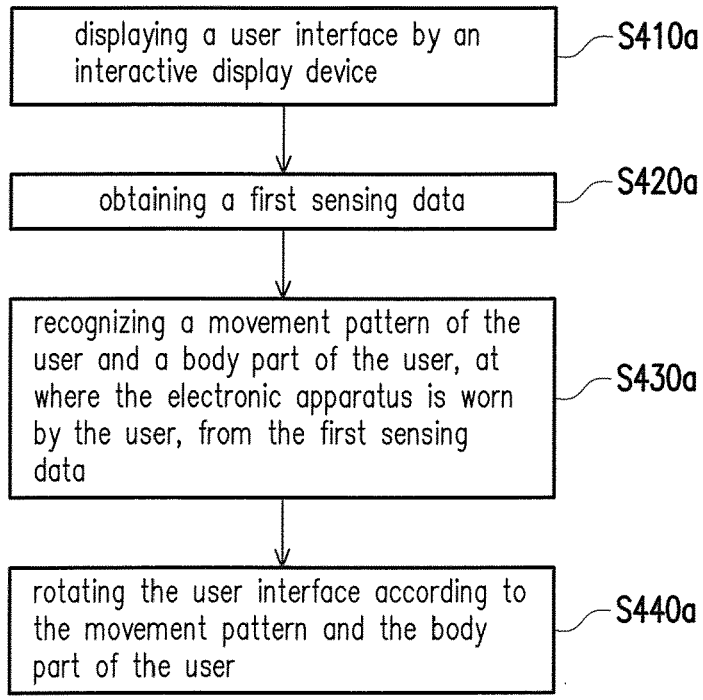
FIG. 4B illustrates a flow graph of a display control method according to another exemplary embodiment of the present disclosure.

FIG. 4B illustrates a flow graph of a display control method according to another exemplary embodiment of the present disclosure. The display control method shown in FIG. 4B for automatically rotating the user interface to the orientation corresponding to the viewing angle of the user is also adapted to the electronic apparatus 10*a*. Firstly, the user interface is displayed by the interactive display device 110 (step S410*a*). After the user interface is displayed, a first sensing data is obtained by the sensing device 140 (step S420*a*). Next, based on the first sensing data from the sensing device 140, movement pattern of the user and a body part of the user, at where the electronic apparatus 10*a* is worn by the user, are recognized by the processor device 130 (step S430*a*).

In the present embodiment, the body part of the user, at where the electronic apparatus 10*a* is worn by the user, is recognized by the processor device 130 for determining the rotation direction of the user interface. For example, the rotation directions of the user interface are different for the electronic apparatus 10*a* worn on right wrist and worn on left wrist of the user. Thus, precise recognition of the body part, at where the electronic apparatus 10*a* is worn by the user, is necessary.

After the movement pattern and the body part of the user are recognized, the processor device 130 rotates the user interface on the interactive display device 110 according to the movement pattern and the body part of the user (step S440*a*). As the result, the user interface is rotated to the orientation corresponding to the viewing angle of the user.

In one embodiment of the present disclosure, the processor device 130 rotates the user interface on the interactive display device 110 for the fixed angle corresponding to the recognized movement pattern based on the first sensing data from the sensing device 140. However, after the user interface is rotated for the fixed angle, if the user interface on the interactive display device 110 is further rotated for an additional angle in accordance with the detected clockwise movement or the detected counter-clockwise movement performed on the supplementary input device 120 such as the bezel 40 shown in FIG. 1C, the processor device 110 updates the fixed angle corresponding to the recognized movement pattern based on the additional angle.

In the previous embodiment, the user interface is capable of being rotated by the processor device 130 based on the first sensing data from the sensing device 140 automatically, and it is also capable of being rotated by the processor device 130 in accordance with the detected clockwise movement or the detected counter-clockwise movement performed by the user on the supplementary input device 120. This allows the user to further rotate the user interface to a favourable orientation by the addition angle even the user interface has been first rotated by the fixed angle corresponding to the type of the sport or the workout that the user is engaged. Also, the processor device 130 updates the fixed angle corresponding to the recognized movement pattern based on the additional angle, such that the user interface may be rotated to the favourable orientation of the user directly next time.

In one embodiment of the present disclosure, another display control method adapted to the electronic apparatus 10*a* is further proposed for automatically rotating the displayed user interface, so as to obtain better viewing quality and visual effect for the user of the electronic apparatus 10*a*. In this embodiment, a secondary electronic apparatus 10*s* is also involved in the proposed display control method.

Figure 5A:
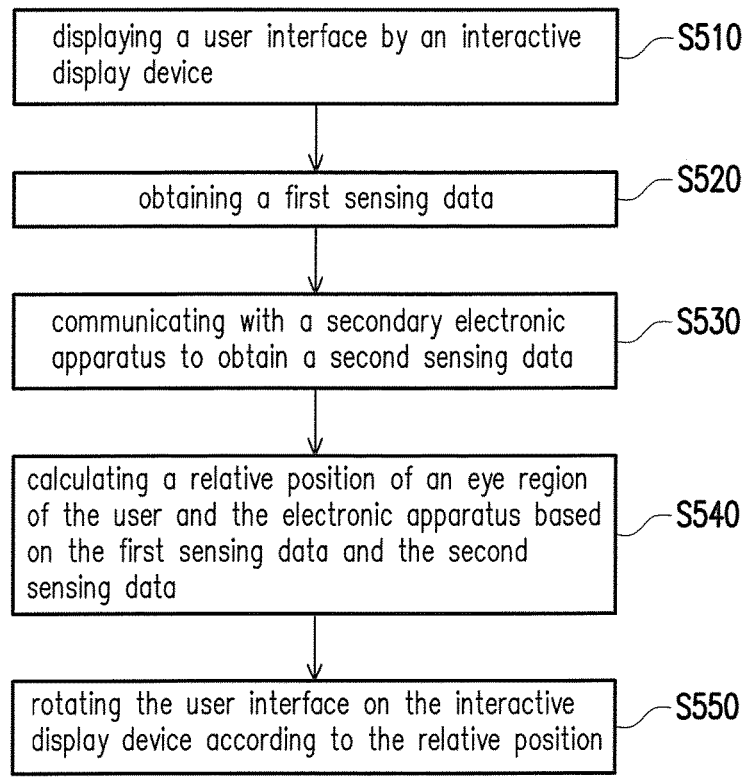
FIG. 5A illustrates a flow graph of a display control method according to still another exemplary embodiment of the present disclosure.
Figure 5B:
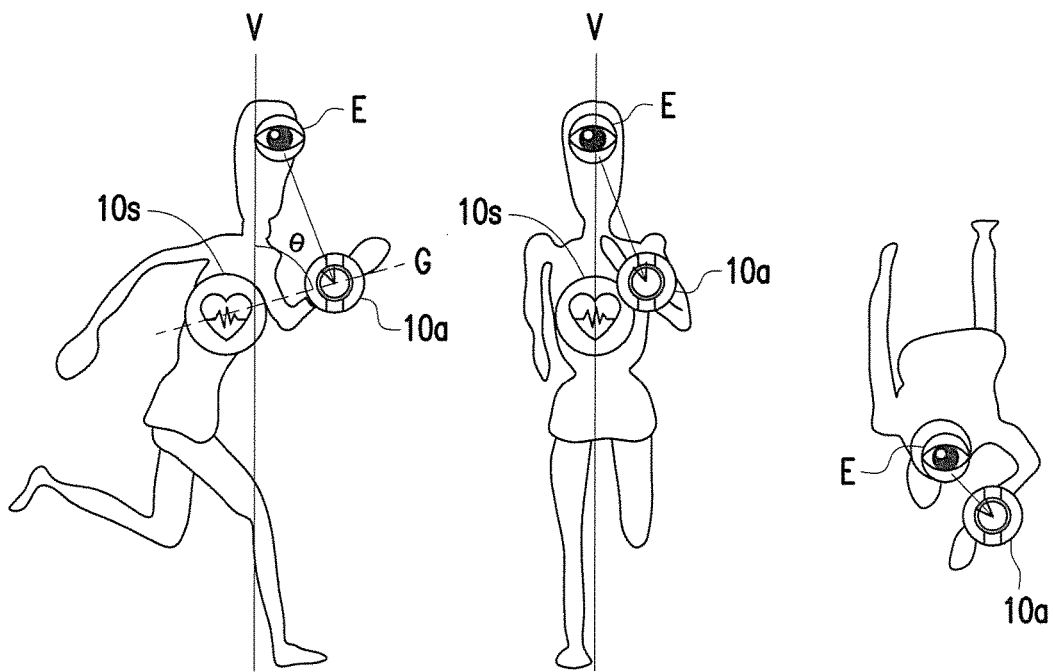
FIG. 5B illustrates a schematic diagram of a display control method according to an exemplary embodiment of the present disclosure.

FIG. 5A illustrates a flow graph of a display control method according to still another exemplary embodiment of the present disclosure. FIG. 5B illustrates a schematic diagram of a display control method according to an exemplary embodiment of the present disclosure. The secondary electronic apparatus 10*s* may include a sensing device (not illustrated) and a communication device (not illustrated). The secondary electronic apparatus 10*s* may be a mobile apparatus or another wearable electronic apparatus implemented in a form of a sticker, a wristband, a heart rate band, a glass, an earphone, a helmet, a mask, a necklace, a watch, a ring, a bracelet, a clothes, a belt, or a shoe, etc., capable of being worn by the user, but is not limited thereto. The electronic apparatus 10*a* communicates with the secondary electronic apparatus 10*s* through the communication device 150.

Referring to FIG. 5A and FIG. 5B, firstly, the user interface is displayed by the interactive display device 110 (step S510). After the user interface is displayed, a first sensing data is obtained by the sensing device 140 (step S520), and the electronic apparatus 10*a* communicates with the secondary electronic apparatus 10*s* to obtain a second sensing data (step S530). The sensing device of the secondary electronic apparatus 10*s* is utilized for sensing at least one of the acceleration, the orientation, the inclination angle, the rotation angle and the facing direction of the electronic apparatus 10*s* as the second sensing data.

In addition, a relative position of an eye region E of the user and the electronic apparatus 10*a* based on the first sensing data and the second sensing data is calculated (step S540). The relative position may be the position, angle, orientation, etc. of the electronic apparatus 10*a* relative to the eye region E of the user. To be more specific, in the present embodiment, the secondary electronic apparatus 10*s* is a heart rate monitor apparatus. Normally, the heart rate monitor apparatus uses a chest strap which fits snugly around the user's chest just below the breast. As shown in FIG. 5B, the secondary electronic apparatus 10*s* worn around the chest and eye region E of the user are aligned or nearly aligned along a vertical axis V.

In one embodiment of the present disclosure, the relative position of an eye region E of the user and the electronic apparatus 10a may be obtained as below. A distance between the secondary electronic apparatus 10s and a viewable position that the electronic apparatus 10a may temporarily and regularly stay during the fitness training or the sport training is calculated based on the first sensing data and the second sensing data. To be more specific, in some types of workout or sport, for example, biking, jogging, swimming, skiing, weight training, cardio training, yoga, ball games, driving, slipping, etc., the movement pattern of the wrist, the arm, the leg or any part of the body, may be regular. Thus, when the electronic apparatus 10a is worn on such part of the body, the movement pattern of the electronic apparatus 10a may also be regular, from which the viewable position that the electronic apparatus 10a may temporarily and regularly stay during the fitness training or the sport training may be obtained or predetermined. It should be noted that, when the electronic apparatus 10a is moved to the viewable position, the user can see the electronic apparatus 10a. That is to say, the viewable position is corresponding to the viewing angle of the user.

Further, a distance between the eye region E of the user and the secondary electronic apparatus 10s may be measured and preset by the user. Specifically, in the present embodiment, the user may use a distance between the eye region E and the chest of the user as the distance between the eye region E of the user and the secondary electronic apparatus 10s. It should be noted that, the distance between the eye region E and the chest of the user may also be learned from the existing studying. Further, angle θ between the vertical axis V and the virtual extension line G which is between the electronic apparatus 10a located at the viewable position and the secondary electronic apparatus 10s may also be obtained from the first sensing data and the second sensing data.

Figure 5C:
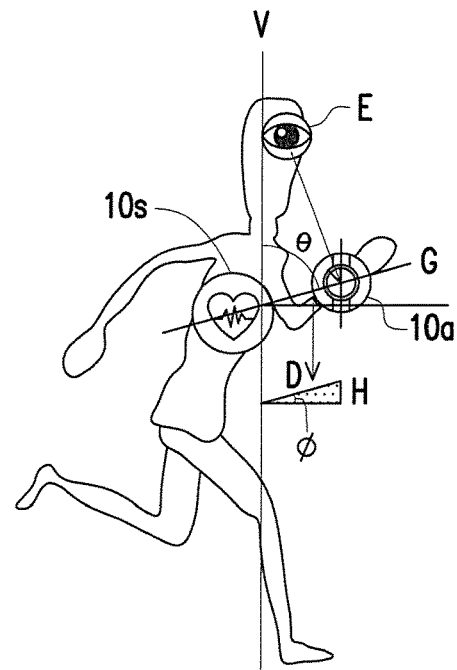
FIG. 5C and FIG. 5D illustrate detailed diagrams of calculating the relative position of the eye region of the user and the electronic apparatus according to an exemplary embodiment of the present disclosure.
Figure 5D:
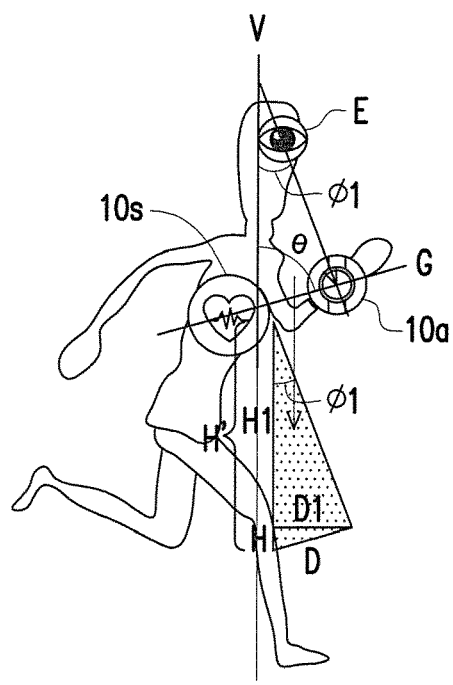

FIG. 5C and FIG. 5D illustrate detailed diagrams of calculating the relative position of the eye region of the user and the electronic apparatus according to an exemplary embodiment of the present disclosure. Referring to FIG. 5C, in the present exemplary embodiment, the heights of the electronic apparatus 10a located at the viewable position and the secondary electronic apparatus 10s are obtained from the sensing devices 140 such as the barometers, and difference H between the heights of the electronic apparatus 10a located at the viewable position and the secondary electronic apparatus 10s may be calculated. Further, distance D between the electronic apparatus 10a located at the viewable position and the secondary electronic apparatus 10s is calculated from a received signal strength indicator (RSSI) value indicating the quality of the communication between the electronic apparatus 10a and the secondary electronic apparatus 10s. Angle ϕ may be calculated when the difference H and the distance D is known, and degree of the angle θ is calculated by subtracting degree of the angle ϕ from 90 degree (90°).

Further, referring to FIG. 5D, in the present exemplary embodiment, the height of the eye region E of the user is obtained from the height of the user, such the difference H' (H+H1) between the heights of the eye region E and the secondary electronic apparatus 10s may be calculated. Also, difference H is calculated based on the heights of the electronic apparatus 10a located at the viewable position and the secondary electronic apparatus 10s, such that the value H1 may be derived from the differences H' and H. Moreover, distance D between the electronic apparatus 10a located at the viewable position and the secondary electronic apparatus 10s is calculated from the RSSI value, and value D1 is calculated based on the difference H and the distance D.

Thus, through the trigonometric functions, angle ϕ1 may be calculated based on the value H1 and the value D1.

Based on the distance D between the secondary electronic apparatus 10s and the viewable position, the distance between the eye region E and the secondary electronic apparatus 10s and the angle θ, the relative position between the eye region E and the electronic apparatus 10a located at the viewable position is calculated. Finally, the user interface on the interactive display device 110 is rotated according to the relative position (step S550).

However, in another embodiment of the present application, instead of finding the viewable position, the electronic apparatus 10a continuously calculates the relative position between the eye region E and the electronic apparatus 10a based on the first sensing data and the second sensing data during the fitness training or the sport training, so as to rotate the user interface on the interactive display device 100 in real time. In another exemplary embodiment, the electronic apparatus 10a further adjusts the brightness and/or contrast of the displayed user interface for better visual effect as well.

Figure 6:
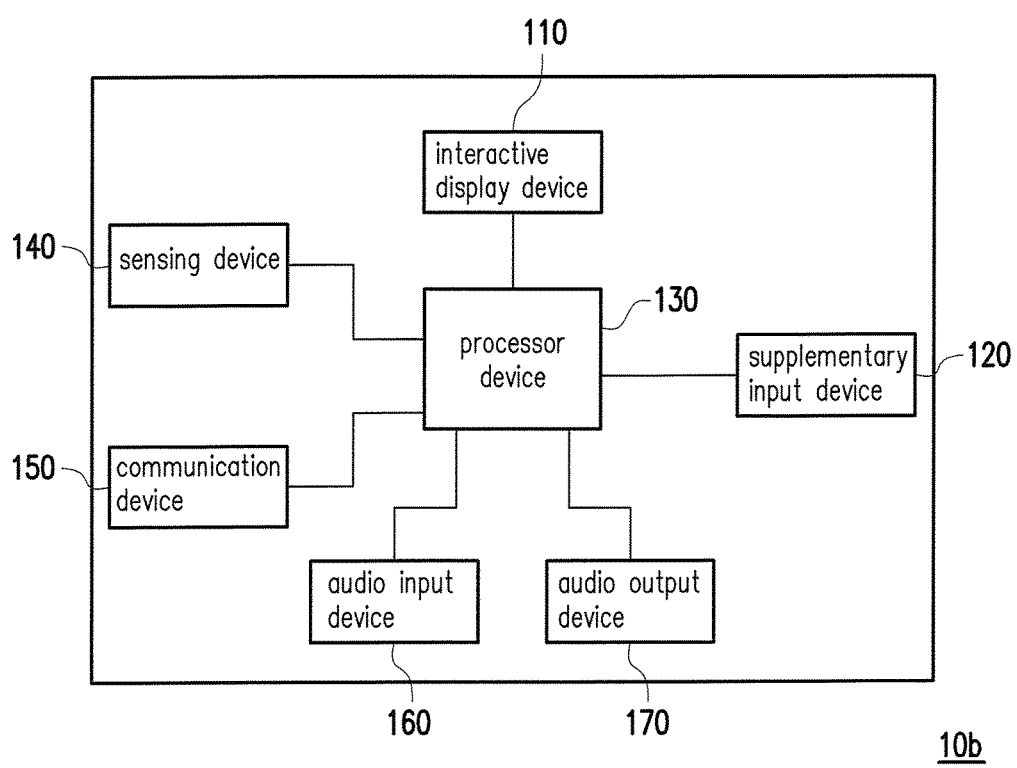
FIG. 6 illustrates a block diagram of an electronic apparatus according to still another exemplary embodiment of the present disclosure.

FIG. 6 illustrates a block diagram of an electronic apparatus according to still another exemplary embodiment of the present disclosure. Referring to FIG. 6, the electronic apparatus 10b is similar to the electronic apparatus 10a, but further includes an audio input device 160 and an audio output device 170 coupled to the processor device 130. In detail, the audio input device 160 may be a microphone, and the audio output device 170 may be a speaker, a headphone, or an earphone, but those are not limited thereto. It should be noted that, in the present embodiment, the audio input device 160 and the audio output device 170 are built-in devices in electronic apparatus 10b. However, in another embodiment, the audio input device 160 and the audio output device 170 may be remote devices which communicate with the electronic apparatus 10b in a wired manner or in a wireless manner.

In the present embodiment, the electronic apparatus 10b may be controlled through a voice command. To be more specific, the voice command announced by the user is received by the electronic apparatus 10b through the audio input device 160. After receiving the voice command, a speech recognition process may be performed by the processor device 120 to transfer the voice command to words, such that the electronic apparatus 10b can recognize the voice command and correspondingly react to the voice command.

For example, when the voice command is related to the interface rotation, the processor device 130 correspondingly rotates the user interface on the interactive display device 110. Specifically, user may request the electronic apparatus 10b to rotate the user interface 45 degrees clockwise/counter-clockwise or rotate the user interface by a predetermined degree. After the voice command is received and passed through the speech recognition by the electronic apparatus 10b, the processor device 130 may recognize the request and thus rotates the user interface 45 degrees clockwise/counter-clockwise or rotate the user interface by the predetermined degree.

For still another example, the user may utilize voice commend to designate which sport training, fitness training, exercise or activity he is engaged, for example, biking, jogging, swimming, skiing, weight training, cardio training, yoga, ball games, driving, slipping, etc., and the user interface is then rotated by the predetermined degree corresponding to the sport training, the fitness training, the exercise or the activity that the user is engaged. The predetermined rotation degrees for different sport trainings, fitness trainings, exercises and activities are different, and those may be predetermined in the electronic apparatus 10b or may be preset by the user.

The electronic apparatus 10b may also provide voice tips to the user through the audio output device 170 according to the operation mode of the electronic apparatus 10b. That is to say, the electronic apparatus 10b may provide voice tips in response to the user's behavior or requirement. For example, the user may follow the real-time voice tips to finish the workout in jogging, swimming, boxing, aerobic exercise, etc., without eyes on the interactive display device 110 under the fitness mode of the electronic apparatus 10b. However, electronic apparatus 10b not only provides the voice tips for the body exercises. Under the driving mode of the electronic apparatus 10b, when the navigation application is executed, the real-time voice tips are provided to the user for route guidance.

When the audio output device 170 is a remote device, such as a wireless speaker, a wireless headphone, and a wireless earphone, the electronic apparatus 10b may further be used as a remote controller of the audio output device 170 with appropriate application. The user may use the electronic apparatus 10b to switch the song, adjust the volume, and adjust the play speed of the audio output device 170. It should be noted that, although the audio data being played by the audio output device 170 may be transmitted from the electronic apparatus 10b, it may also be transmitted from another server device directly connected to the audio output device 170.

The remote audio input device 160 and the remote audio output device 170 may connect to the electronic apparatus 10b in wireless manner through the communication device 150. To be more specific, the electronic apparatus 10b may communicate with the remote audio input device 160 and the remote audio output device 170 via the wireless communication protocol such as WI-FI protocol and Bluetooth protocol, but is not limited thereto.

The electronic apparatus 10b with the remote audio output device 170 may be used in sleep aiding. Specifically, when the sensing device 140 of the electronic apparatus 10b worn by the user detects that user is lay on the bed or lay down for sleep, the electronic apparatus 10b controls the remote audio output device 170 to play sleep aid music for better sleep quality. Further, when the sensing device 140 of the electronic apparatus 10b worn by the user detects that the user is fall in sleep, the electronic apparatus 10b controls the remote audio output device 170 to turn down the volume or stop playing the sleep aid music. Furthermore, the electronic apparatus 10b with the remote audio output device 170 may also be used as an alarm clock. To be more specific, an alarm clock application can be executed by the electronic apparatus 10b, and the alarm will go off at the specified time set by the user. The user may choose his favorite song or music as the alarm, and the electronic apparatus 10b will play the song or music at the specified time though the audio output device 170 to wake up the user. In another exemplary embodiment, the electronic apparatus 10b further detects the user's mood by detecting his physiological features, facial expression, and/or emotional expression, and then plays appropriate music or song to give comfort to the user.

In summary, the electronic apparatus wearable for the user and the display control method thereof allow the user to manually control the electronic apparatus and the user interface through the clockwise movement and the counter-clockwise movement performed on the supplementary input device. The user interface may also be rotated by the electronic apparatus based on various factors such as the movement pattern and the traveling direction of the user. In addition, the user interface may be rotated by the user through the voice command as well. As the result, the user can easily view the displayed user interface of the electronic apparatus, and better viewing quality and visual effect can be achieved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents

What is claimed is:

1. An electronic apparatus, which is wearable for a user, comprising:
   an interactive display device, displaying a user interface;
   a supplementary input device; and
   a processor device, coupled to the interactive display device and the supplementary input device, detecting a clockwise movement and a counter-clockwise movement performed on the supplementary input device, and recognizing a movement pattern of the user,
   wherein the processor device rotates the user interface on the interactive display device for a fixed angle corresponding to the recognized movement pattern,
   after the user interface is rotated for the fixed angle to a first orientation corresponding to the recognized movement pattern, if the user interface on the interactive display device is further rotated for an additional angle to a second orientation in accordance with the one of the detected clockwise movement and the detected counter-clockwise movement, the processor device updates the fixed angle corresponding to the recognized movement pattern based on the additional angle to serve as an updated angle, such that next time the processor device rotates the user interface directly for the updated angle to the second orientation corresponding to the same recognized movement pattern.

2. The electronic apparatus according to claim 1, wherein the supplementary input device is also rotated with the clockwise movement and the counter-clockwise movement performed on the supplementary input device.

3. The electronic apparatus according to claim 1, further comprising:
   a sensing device, coupled to the processor device, obtaining a first sensing data,
   wherein the processor device recognizes the movement pattern of the user from the first sensing data.

4. The electronic apparatus according to claim 3, wherein the processor device further recognizes a traveling direction of the user from the first sensing data, and rotates the user interface on the interactive display device for the fixed angle according to the movement pattern and the traveling direction of the user.

5. The electronic apparatus according to claim 3, wherein the processor device further recognizes a body part of the user, at where the electronic apparatus is worn by the user, and rotates the user interface on the interactive display device for the fixed angle according to the body part and the movement pattern of the user.

6. The electronic apparatus according to claim 3, wherein the electronic apparatus further comprises:
   a communication device, coupled to the processor device, communicating with a secondary electronic apparatus,
   wherein the communication device obtains a second sensing data from the secondary electronic apparatus, the processor device calculates a relative position of an eye region of the user and the electronic apparatus based on the first sensing data and the second sensing data, and rotates the user interface on the interactive display device for the fixed angle according to the relative position.

7. The electronic apparatus according to claim 1, further comprising:
an audio input device, coupled to the processor device, receiving a voice command, wherein when the voice command received by the audio input device is related to an interface rotation, the processor device correspondingly rotates the user interface on the interactive display device; and
an audio output device, coupled to the processor device, providing a voice tip according to an operation mode of the electronic apparatus.

8. A display control method, adapted to an electronic apparatus wearable for a user, the display control method comprising:
displaying a user interface by an interactive display device;
recognizing a movement pattern of the user;
rotating the user interface on the interactive display device for a fixed angle corresponding to the recognized movement pattern;
detecting a clockwise movement and a counter-clockwise movement performed on a supplementary input device after the user interface is rotated for the fixed angle to a first orientation corresponding to the recognized movement pattern; and
if the user interface on the interactive display device is further rotated for an additional angle to a second orientation in accordance with the one of the detected clockwise movement and the detected counter-clockwise movement, updating the fixed angle corresponding to the recognized movement pattern based on the additional angle to serve as an updated angle, such that next time the user interface is rotated directly for the updated angle to the second orientation corresponding to the same recognized movement pattern.

9. The display control method according to claim 8, wherein the step of recognizing the movement pattern of the user comprises:

obtaining a first sensing data; and
recognizing the movement pattern of the user from the first sensing data.

10. The display control method according to claim 9, wherein the step of recognizing the movement pattern further comprises:
recognizing a traveling direction of the user from the first sensing data,
the step of rotating the user interface for the fixed angle comprises:
rotating the user interface for the fixed angle according to the movement pattern and the traveling direction of the user.

11. The display control method according to claim 9, wherein the step of recognizing the movement pattern further comprises:
recognizing a body part of the user, at where the electronic apparatus is worn by the user,
the step of rotating the user interface for the fixed angle comprises:
rotating the user interface for the fixed angle according to the body part and the movement pattern of the user.

12. The display control method according to claim 8, wherein the step of recognizing the movement pattern of the user comprises:
obtaining a first sensing data;
communicating with a secondary electronic apparatus to obtain a second sensing data; and
calculating a relative position of an eye region of the user and the electronic apparatus based on the first sensing data and the second sensing data;
wherein the step of rotating the user interface for the fixed angle comprises:
rotating the user interface on the interactive display device for the fixed angle according to the relative position.

13. The display control method according to claim 8, further comprising:
receiving a voice command; and
when the voice command is related to an interface rotation, correspondingly rotating the user interface.

14. The display control method according to claim 8, further comprising:
providing a voice tip according to an operation mode of the electronic apparatus.

* * * * *